United States Patent
Goto (10) Patent No.: US 10,459,458 B2
(45) Date of Patent: Oct. 29, 2019

(54) MASS FLOW CONTROLLER AND DIAGNOSTIC METHOD FOR DIFFERENTIAL PRESSURE TYPE FLOW METER

(71) Applicant: HITACHI METALS, LTD., Minato-ku, Tokyo (JP)

(72) Inventor: Takao Goto, Mie (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 15/760,136

(22) PCT Filed: Sep. 21, 2016

(86) PCT No.: PCT/JP2016/077837
§ 371 (c)(1),
(2) Date: Mar. 14, 2018

(87) PCT Pub. No.: WO2017/057129
PCT Pub. Date: Apr. 6, 2017

(65) Prior Publication Data
US 2018/0253111 A1 Sep. 6, 2018

(30) Foreign Application Priority Data
Sep. 30, 2015 (JP) ................................. 2015-192680

(51) Int. Cl.
*G05D 7/06* (2006.01)
*G01F 25/00* (2006.01)

(52) U.S. Cl.
CPC ....... *G05D 7/0623* (2013.01); *G01F 25/0007* (2013.01); *G05D 7/0635* (2013.01)

(58) Field of Classification Search
CPC . G01F 25/0007; G05D 7/0623; G05D 7/0635
See application file for complete search history.

(56) References Cited

U.S. PATENT DOCUMENTS

2010/0070240 A1* 3/2010 Yasuda ..................... G01F 1/50
702/183

FOREIGN PATENT DOCUMENTS

| JP | 2000-137528 A | 5/2000 |
| JP | 2000-214916 A | 8/2000 |

(Continued)

OTHER PUBLICATIONS

WIPO, International Search Report for International Patent Application No. PCT/JP2016/077837, dated Nov. 2, 2016 (5 pages).

*Primary Examiner* — Yuhui R Pan
(74) *Attorney, Agent, or Firm* — Neugeboren O'Dowd PC (57) ABSTRACT

A recording means records a value of pressure of fluid on a downstream side of a differential pressure generation means during a time period after a flow control valve open and control of a flow rate is started or after the flow control valve is closed and the control of a flow rate is stopped until a measured flow rate becomes stable, and a diagnostic means contrasts a controlled value acquired based in a value of the pressure of the fluid on the downstream side recorded by the recording means, with a controlled value when abnormality has not occurred, and diagnoses that abnormality has occurred in the flow meter when a difference between the both controlled values exceeds a threshold. Thereby, a mass flow controller and a diagnostic method which can simply diagnose generation of abnormality in a differential pressure type flow meter without requiring time only for performing the diagnosis.

18 Claims, 6 Drawing Sheets

(56) References Cited

FOREIGN PATENT DOCUMENTS

| | | |
|---|---|---|
| JP | 2004-157719 A | 6/2004 |
| JP | 2005-534110 A | 11/2005 |
| JP | 2010-091320 A | 4/2010 |
| JP | 2012-226627 A | 11/2012 |

* cited by examiner

MASS FLOW CONTROLLER AND DIAGNOSTIC METHOD FOR DIFFERENTIAL PRESSURE TYPE FLOW METER

CLAIM OF PRIORITY UNDER 35 U.S.C. § 371

The present Application for Patent is a National Phase of International Patent Application No. PCT/JP2016/077837, filed Sep. 21, 2016 which claims priority to JP Patent Application No. 2015-192680, filed Sep. 30, 2015 both of which are assigned to the assignee hereof and hereby expressly incorporated by reference herein.

BACKGROUND

Field

This invention relates generally to a mass flow controller, and more specifically to a mass flow controller which controls a mass flow rate of fluid based on a measured value of pressure or differential pressure of the fluid. Even more specifically, this invention relates to a method for diagnosing an abnormality in a differential pressure type flow meter, and relates also to a diagnostic method for a differential pressure type flow meter which constitutes a mass flow controller.

Background

A mass flow controller is control equipment constituted by a flow meter which measures a flow rate of fluid, a flow control valve which controls the flow rate of the fluid, a control circuit which controls these, and other parts. The mass flow controller is widely used for the purpose of controlling a mass flow rate of gas supplied into a chamber in a manufacturing process of a semiconductor, etc., for example.

There are various types of flow meters used for a mass flow controller. In a mass flow controller used for the purpose of controlling a mass flow rate of gas in a manufacturing process of a semiconductor, a thermal type flow meter or a pressure type flow meter is mainly used. Among these, as a pressure type flow meter, for example, what uses a property that a flow rate of gas depends only on pressure of the gas on an upstream side when flow velocity of the gas flowing through a member referred to as an orifice or a throttle nozzle is a speed of sound (which will be referred to as an "orifice type flow meter" hereafter) and what measures a flow rate based on a difference between a value of pressure of gas on an upstream side and a value of pressure of the gas on a downstream side of a differential pressure generation means (which will be referred to as a "differential pressure type flow meter" hereafter), etc. can be mentioned.

In the orifice type flow meter, gas passes through a narrow path. When an object adheres to this narrow path and cross sectional area of the path changes, it becomes impossible for the flow meter to correctly measure a flow rate. Also in the differential pressure type flow meter, when an object adheres to a differential pressure generation means and the resistance to fluid changes, the same failure occurs. Therefore, in a mass flow controller using a pressure type flow meter, methods for diagnosing whether such abnormality has occurred have been proposed.

For example, Japanese Patent Application Laid-Open (kokai) No. 2000-137528 ("PTL1") discloses a method for detecting a clogging in an orifice by contrasting pressure attenuation data of gas on an upstream side of the orifice when a control valve prepared on the upstream side of the orifice is closed with reference pressure attenuation data measured under the same conditions when there was no clogging in the orifice, in a mass flow controller using an orifice type flow meter.

Moreover, for example, Japanese Patent Application Laid-Open (kokai) No. 2000-214916 ("PTL2") discloses a nozzle diagnostic mechanism for diagnosing a throttle nozzle by comparing a time-dependent change of gas pressure value on an upstream side of the throttle nozzle when a flow regulating valve prepared on the upstream side of the throttle nozzle is closed momentarily with a reference value measured at the time of assembling of a mass flow controller, in the mass flow controller using an orifice type flow meter.

Furthermore, for example, Japanese Patent Application Laid-Open (kokai) No. 2004-157719 ("PTL3") discloses a diagnostic mechanism for diagnosing a clogging in a differential pressure generation means with high precision by comparing a time-integrated value of pressure in a period during which a value of pressure of fluid on an upstream side or downstream side of a valve prepared on an upstream side of a differential pressure generation means becomes second pressure from first pressure when the valve is closed, with a predetermined specified value, in a mass flow controller using a differential pressure type flow meter.

SUMMARY

Aspects may be characterized as a mass flow controller, which comprises a flow meter configured to measure a flow rate of fluid based on a value of first pressure that is pressure of the fluid on an upstream side of a differential pressure generation means interposed in a path of the fluid and a value of second pressure that is pressure of the fluid on a downstream side of the differential pressure generation means, a flow control valve configured to control the flow rate of the fluid, and a control means configured to output a control signal to the flow control valve such that a measured flow rate that is a flow rate of the fluid measured by the flow meter matches a set flow rate that is a target value of the flow rate of the fluid; wherein the mass flow controller further comprises a recording means configured to record both or either one of an opening pressure value that is a value of the second pressure during a time period after the flow control valve changes from a closed state to an open state and control of the flow rate is started until the measured flow rate becomes stable and a closing pressure value that is a value of the second pressure during a time period after the flow control valve changes from the open state to the closed state and control of the flow rate is stopped until the measured flow rate becomes zero, and a diagnostic means configured to diagnose that abnormality has occurred in the flow meter when an absolute value of a difference between a measured controlled value that is a controlled value acquired based on both or either one of the opening pressure value and said closing pressure value and an initial controlled value that is the controlled value when abnormality has not occurred in the flow meter exceeds a predetermined threshold. Moreover, a diagnostic method for a differential pressure type flow meter according to the present invention is a method for judging whether abnormality has occurred in a flow meter which constitutes a mass flow controller as mentioned above.

In the above-mentioned configuration, an operation for diagnosing whether abnormality has occurred in the flow meter is performed, when the flow control valve is opened in order to start control of a flow rate and/or when the flow control valve is closed in order to stop the control of the flow rate. Therefore, it is not necessary to prepare time for the diagnosis apart from time for the control of the flow rate as in the conventional technology, and gas is not discarded vainly for performing the diagnosis.

Moreover, since a time period after performing a switching action of the flow control valve in the differential pressure type flow meter until the flow rate of gas passing through the differential pressure generation means becomes stable is shorter as compared with a time period required for pressure attenuation of gas passing through an orifice or a throttle nozzle in an orifice type flow meter, the diagnostic can be completed in shorter time. Therefore, the mass flow controller according to the present invention is suitable for simply diagnosing generation of abnormality in a differential pressure type flow meter while it is not suitable enough for diagnosing a clogging in a differential pressure generation means with high precision like the conventional technology disclosed in Japanese Patent Application Laid-Open (kokai) No. 2004-157719.

The mass flow controller according to an embodiment comprises a mechanical pressure regulating valve disposed adjacent to and on an upstream side of the flow meter. In this configuration, a value of pressure of the fluid on an upstream side of the flow meter is maintained at a fixed value by an action of the mechanical pressure regulating valve. For this reason, this embodiment is beneficial because a value of the pressure of the fluid on the downstream side (second pressure) is not affected by influence of fluctuation of a value of the pressure of the fluid on an upstream side (first pressure), and the diagnosis of generate of abnormality can be performed with high precision based on a controlled value acquired based on the value of the pressure of the fluid on the downstream side.

In an accordance with an embodiment of the mass flow controller an an aspect of the diagnostic method for a differential pressure type flow meter, because it is not necessary to prepare time for the diagnosis apart from time for the control of the flow rate, and gas can be effectively used without being discarded vainly. Moreover, generation of abnormality in a flow meter which results from abnormality in a pressure sensor and/or a differential pressure generation means can be diagnosed quickly and simply.

DETAILED DESCRIPTION

Technical Problem

A state that a clogging occurred in an orifice of a pressure type flow meter and a differential pressure generation means, etc. can be detected by implementing the invention disclosed in the above-mentioned Patent Documents PTL1 to PTL3. Therefore, these inventions contribute to improvement in reliability of a mass flow rate in a point that they have effectiveness of preventing generation of error of a measured value by a pressure type flow meter and abnormality in a flow rate of supplied gas due to such abnormality.

Moreover, since all of these inventions use a value of pressure measured by a pressure sensor, there is a possibility that abnormality, such as a trouble and false operation of the pressure sensor can be detected by implementing these inventions.

However, when implementing these inventions, it is necessary to prepare time only for chiefly diagnosing generation of abnormality apart from and in addition to time for performing a flow control operation of gas, which is a primary objective of a mass flow controller. Since a flow rate of gas flowing during the former time is not controlled, the gas cannot be used as gas supplied into a chamber in a manufacturing process of a semiconductor, for example, but must be discarded vainly.

Moreover, since cross sectional area of a path of gas in a differential pressure generation means of a differential pressure type flow meter is larger as compared with cross sectional area of a path of gas in an orifice of an orifice type flow meter, probability that a clogging will occur in a differential pressure generation means is not so high. Therefore, in a mass flow controller using a differential pressure type flow meter, it is considered to be more effective to always diagnose or monitor whether a value of pressure measured by a pressure sensor is correct or not (namely, whether abnormality of a pressure sensor and/or a differential pressure generation means has occurred or not) than to diagnose a clogging in a differential pressure generation means with high precision, in order to improve reliability of a mass flow controller. However, no method for simply diagnosing generation of abnormality in a differential pressure type flow meter has been known.

Embodiments of the present invention have been made in view of the above-mentioned problems which a mass flow controller using a conventional pressure type flow meter has, and one objective of the present invention is to provide a mass flow controller which can simply diagnose generation of abnormality in a differential pressure type flow meter without requiring time only for diagnosing generation of abnormality. Furthermore, another objective of the present invention is to provide a diagnostic method for a differential pressure type flow meter which constitutes a mass flow controller which can simply diagnose generation of abnormality in a differential pressure type flow meter without requiring time only for diagnosing generation of abnormality.

Embodiments for implementing the present invention will be explained in detail referring to drawings. However, the embodiments explained here are just examples of embodiments of the present invention, and embodiments of the present invention are not limited those exemplified here.

Figure 1:
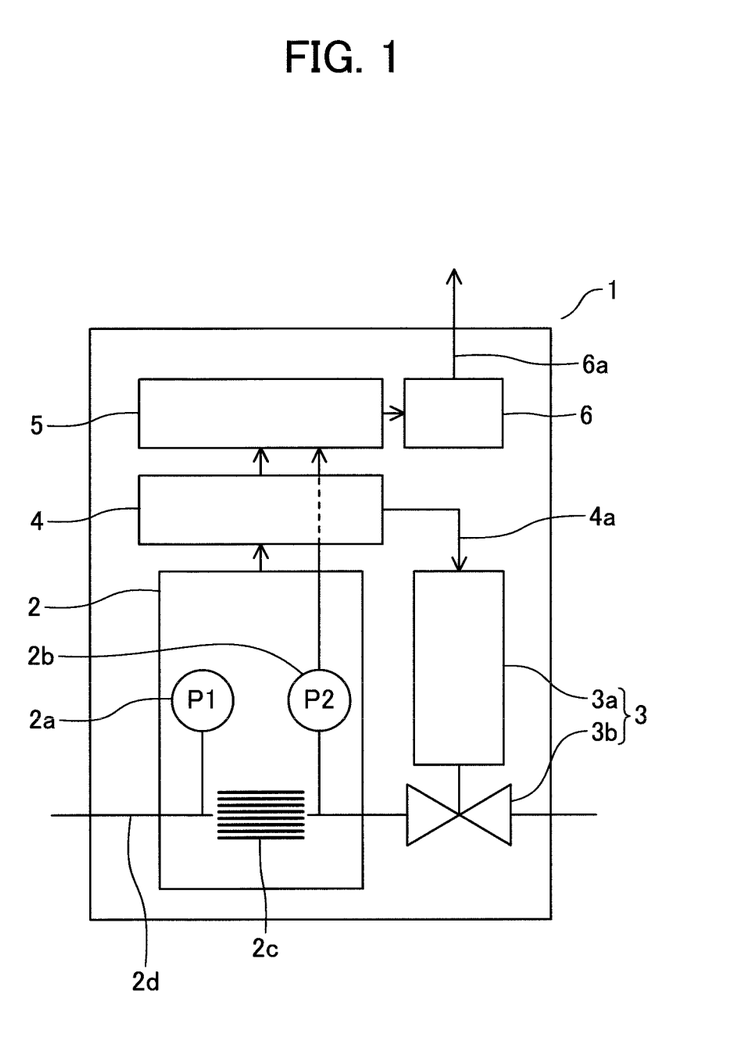
FIG. 1 is a schematic view for showing an example of a configuration of a mass flow controller according to the present invention.

FIG. 1 is a schematic view for showing an example of a configuration of a mass flow controller according to the present invention. The mass flow controller 1 according to the present invention comprises a flow meter 2 configured to measure a flow rate of fluid based on a value (P1) of first pressure that is pressure of the fluid on an upstream side of a differential pressure generation means 2c interposed in a path 2d of the fluid and a value (P2) of second pressure that is pressure of the fluid on a downstream side of the differential pressure generation means 2c, a flow control valve 3 configured to control the flow rate of the fluid, and a control means 4 configured to output a control signal 4a to the flow control valve 3 such that a measured flow rate that is a flow rate of the fluid measured by the flow meter 2 matches a set flow rate that is a target value of the flow rate of the fluid. FIG. 1 is intended for merely showing a logical relation between respective constituent elements, not for showing a mounting state of the constituent elements of the mass flow controller 1.

The flow meter 2 comprises a means to detect a difference of the value (P1) of the first pressure that is pressure of the fluid on an upstream side of the differential pressure generation means 2c and the value (P2) of the second pressure that is pressure of the fluid on a downstream side of the differential pressure generation means 2c. As a specific means to detect the difference of a pressure, for example, a means configured to detect the difference between values indicated by separate pressure sensors 2a and 2b prepared on an upstream side and a downstream side of the differential pressure generation means 2c can be mentioned. Alternatively, differential pressure can be detected using one differential pressure sensor connected with a conduit (pipe) in communication with the upstream side of the differential pressure generation means 2c and a conduit (pipe) in communication with the downstream side of the differential pressure generation means 2c.

In the present specification, unless otherwise mentioned, "pressure of fluid on an upstream side" and "pressure of fluid on a downstream side" mean "pressure of fluid on an upstream side of a differential pressure generation means (first pressure)" and "pressure of fluid on a downstream side of a differential pressure generation means (second pressure)", respectively. Here, the "upstream side" and "downstream side" are defined on the basis of a flow direction of fluid in the mass flow controller 1. For example, in FIG. 1, since fluid flows from left side toward right side in the mass flow controller 1, the left side of the differential pressure generation means 2c corresponds to the upstream side, and the right side of the differential pressure generation means 2c corresponds to the downstream side.

The "pressure of the fluid on an upstream side of a differential pressure generation means" and the "pressure of fluid on a downstream side of a differential pressure generation means" are not necessarily limited to pressure at parts adjacent to the differential pressure generation means, and they may be pressure at parts other than the parts adjacent to the differential pressure generation means, at which pressure equivalent to the pressure at the parts adjacent to the differential pressure generation means can be detected, in the mass flow controller 1 or at the periphery thereof.

As long as the differential pressure generation means 2c has resistance to flowing fluid and produces pressure loss between the pressure of the fluid on the upstream side and the pressure of the fluid on the downstream side, the differential pressure generation means 2c may have any kind of structure. As the differential pressure generation means, those having a well-known structure, such as that having a structure in which many pipes with same length are bundled and that having a honeycomb structure, may be used, for example.

The flow meter 2 measures a flow rate of fluid based on the value (P1) of the first pressure that is the pressure of the fluid on the upstream side of the differential pressure generation means 2c and the value (P2) of the second pressure that is the pressure of the fluid on the downstream side of the differential pressure generation means 2c, and is classified into the above-mentioned differential pressure type flow meter. Specifically, the flow meter 2 measures a flow rate of fluid based on a difference between the value (P1) of the first pressure and the value (P2) of the second pressure. For example, the flow meter 2 measures a flow rate of fluid based on a difference (P1−P2) between the value (P1) of the first pressure and the value (P2) of the second pressure. Specifically, the flow rate of the fluid is correlated with the difference (P1−P2) between the value (P1) of the pressure of the fluid on the upstream side and the value (P2) of the pressure of the fluid on the downstream side of the differential pressure generation means 2c, under a certain condition. More specifically, the flow rate of the fluid is proportional to the difference (P1−P2) between the value (P1) of the pressure of the fluid on the upstream side and the value (P2) of the pressure of the fluid on the downstream side of the differential pressure generation means 2c, under a certain condition. The flow meter 2 can measure the flow rate of the fluid using this property. When measuring the flow rate of the fluid, the flow meter 2 may correct the flow rate based on physical quantity other than the difference (P1−P2) of the value (P1) of the pressure of the fluid on the upstream side and the value (P2) of the pressure of the fluid on the downstream side, such as temperature and a pressure, etc., for example.

The flow control valve 3 is configured to control the flow rate of the fluid based on the control signal 4a output from the control means 4, which will be mentioned later. The flow control valve 3 may comprise an actuator 3a, which opens and closes a valve, and a valve 3b. As the actuator 3a, a piezo-electric element controlled by a voltage signal and a solenoid controlled by an electric-current signal, etc. may be used, for example. As the valve 3b, a diaphragm valve constituted by a diaphragm and a valve seat, etc. may be used, for example. The flow control valve 3 may be disposed on the upstream side of the flow meter 2, as exemplified in FIG. 1, or it may be disposed on the downstream side of the flow meter 2.

The control means 4 is configured to output the control signal 4a to the flow control valve 3 such that a measured flow rate that is a flow rate of the fluid measured by the flow meter 2 matches a set flow rate. For this reason, the control means 4 has a means to be input the measured flow rate measured by the flow meter 2 thereto. The set flow rate is a target value of the flow rate of the fluid, which is predetermined in the mass flow controller 1. The control means 4 generates the control signal 4a controlled to make the measured flow rate measured by the flow meter 2 match the set flow rate, and outputs this (control signal 4a) to the flow control valve 3. A value of the control signal 4a output by the control means 4 is determined by a well-known control method, such as feedback control based on the measured flow rate, for example.

The mass flow controller 1 according to the present invention is characterized by further comprising a recording means 5 and a diagnostic means 6. The recording means 5 is configured to record both or either one of an opening pressure value and a closing pressure value. Here, the opening pressure value is a value (P2) of pressure of the fluid on the downstream side (second pressure) during a time period after the flow control valve 3 changes from a closed state to an open state and the control of the flow rate is started until the measured flow rate becomes stable. On the other hand, the closing pressure value is a value (P2) of pressure of the fluid on the downstream side (second pressure) during a time period after the flow control valve 3 changes from the open state to the closed state and control of the flow rate is stopped until the measured flow rate becomes zero.

The recording means 5 records the value (P2) of pressure of the fluid on the downstream side (second pressure). As the value (P2) of pressure of the fluid on the downstream side, an output from the pressure sensor on the downstream side (second sensor 2b) may be directly input and recorded as exemplified in FIG. 1, or the value (P2) of the pressure of the fluid on the downstream side may be processed by the control means 4, indirectly input and recorded. The value (P2) of pressure of the fluid on the downstream side may be data converted by an analog/digital converter, for example. The recording means 5 may be constituted by a memory in which data representing the value (P2) of the pressure of the fluid on the downstream side is time-serially recorded, etc., for example. Time interval, at which the value (P2) of the pressure of the fluid on the downstream side is recorded, may be the same time as a clock period of a central processing unit (CPU) constituting the control means 4, for example. This time is 10 ms (millisecond), for example.

As mentioned above, the time period during which the recording means 5 records the value (P2) of the pressure of the fluid on the downstream side is both or either one of a time period after the flow control valve 3 changes from a closed state to an open state and the control of the flow rate is started until the measured flow rate becomes stable and a time period after the flow control valve 3 changes from the open state to the closed state and control of the flow rate is stopped until the measured flow rate becomes zero. Under a usual operating condition of a mass flow controller, none of these time periods greatly exceeds 0.5 s (second). Timing, at which the recording means 5 starts recording and stops recording, may be determined by the signal output from the control means 4 to the recording means 5, for example.

Figure 2:
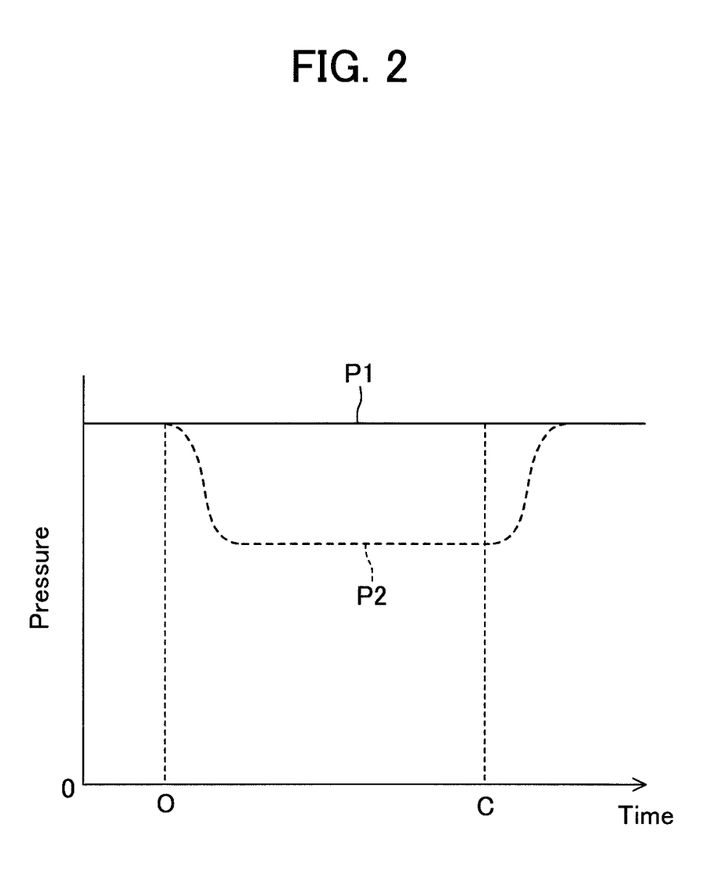
FIG. 2 is a graph for showing an example of change with time of a value (P1) of pressure of fluid on an upstream side (first pressure) and a value (P2) of pressure of the fluid on a downstream side (second pressure) of a differential pressure generation means 2c in the mass flow controller according to aspects of the present invention.

FIG. 2 is a graph for showing an example of change with time (time shift) of the value (P1) of pressure of the fluid on the upstream side (first pressure) and the value (P2) of pressure of the fluid on the downstream side (second pressure) of the differential pressure generation means 2c in the mass flow controller 1. The change with time of the value (P1) of pressure of the fluid on the upstream side and the change with time of the value (P2) of pressure of the fluid on the downstream side are indicated in a solid line and a broken line, respectively. In a horizontal axis, the symbol "O" shows a time point when the flow control valve 3 changed from its closed state to its open state (Open) and the control of a flow rate is started. Moreover, the symbol "C" shows a time point when the flow control valve 3 changes from its open state to its closed state (Close) and the control of a flow rate is stopped. In this example, till the time point shown with the symbol "O", the flow control valve 3 has closed and both the value (P1) of the pressure of the fluid on the upstream side and the value (P2) of the pressure of the fluid on the downstream side of the differential pressure generation means 2c in the mass flow controller 1 are constant in an equal value. The value (P1) of the pressure of the fluid on the upstream side and the value (P2) of the pressure of the fluid on the downstream side during this time period is a value of 100 kPa or more and 300 kPa or less, for example.

When it reaches the time point shown with the symbol "O", the flow control valve 3 opens and the control of a flow rate is started. Although the value (P1) of the pressure of the fluid on the upstream side of the differential pressure generation means 2c (first pressure) in the mass flow controller 1 does not change, the value (P2) of the pressure of the fluid on the downstream side (second pressure) starts dropping from the value (P1) of the pressure of the fluid on the upstream side by an action of the differential pressure generation means 2c. Thereafter, the value (P2) of the pressure of the fluid on the downstream side becomes stable at a value lower than the value (P1) of the pressure of the fluid on the upstream side by an action of the control means 4, and the measured flow rate becomes stable. The value (P2) of the pressure of the fluid on the downstream side at this time is a value of 30 kPa or more and 100 kPa or less, for example. The recording means 5 records, as a value of the opening pressure, a value of the second pressure in a time period after the flow control valve 3 changes from its closed state to its open state and the control of the flow rate is started in this way until the measured flow rate becomes stable.

Next, when it reaches the time point shown with the symbol "C", the flow control valve 3 is closed and the control of a flow rate is stopped. The value (P2) of the pressure of the fluid on the downstream side of the differential pressure generation means 2c in the mass flow controller 1 starts increasing. Thereafter, the value (P2) of the pressure of the fluid on the downstream side continues to increase until it matches the value (P1) of the pressure of the fluid on the upstream side and becomes stable, and the measured flow rate becomes zero. The recording means 5 records, as a value of the closing pressure, a value of the second pressure during a time period after the flow control valve 3 changes from its open state to its closed state and the control of the flow rate is stopped in this way until the measured flow rate becomes zero.

The diagnostic means 6 acquires a controlled value based on the value (P2) of the pressure of the fluid on the downstream side (second pressure) recorded by the recording means 5. When obtaining of the controlled value, the value (P2) of the pressure of the fluid on the downstream side sampled in the above-mentioned specific time period and recorded by the recording means 5 is used. Namely, the controlled value is acquired based on both or either one of the values of the opening pressure and the closing pressure recorded by the recording means 5. During these periods, the value (P2) of the pressure of the fluid on the downstream side decreases or increases within a short time period. At this time, the value (P2) of the pressure of the fluid on the downstream side shows a time change peculiar to the mass flow controller 1. Therefore, unless a state of the mass flow controller 1 changes, the value (P2) of the pressure of the fluid on the downstream side shows an identical time change when controlling the flow rate of the same kind of fluid under a condition with identical temperature, pressure and the set flow rate.

The controlled value is a representative value reflecting the time change of the value (P2) of the pressure of the fluid on the downstream side (second pressure) recorded by the recording means 5. As long as the controlled value is a representative value specified (acquired) uniquely based on the time change of the value (P2) of the pressure of the fluid on the downstream side, any kind of representative value may be chosen. As the controlled value, one kind of representative value may be chosen, or two or more kinds of a plurality of representative values may also be chosen.

The diagnostic means 6 is configured to diagnose that abnormality has occurred in the flow meter 2 when the absolute value of the difference between a measured control value and an initial controlled value exceeds a predetermined threshold (larger than the predetermined threshold). Here, the measured control value is a controlled value acquired based on both or either one of the opening pressure value and the closing pressure value when the mass flow controller 1 is under operation. On the other hand, the initial controlled value is a controlled value acquired based on both or either one of the opening pressure value and the closing pressure value when abnormality has not occurred in the flow meter 2. "When abnormality has not occurred in the flow meter 2" means when the flow meter 2 is used for the first time after the flow meter 2 is built in the mass flow controller 1 after production and when the flow meter 2 is used for the first time after calibrating (calibration) of the flow meter 2 is performed, etc., for example. Therefore, the diagnostic means 6 comprises a means to memorize the initial controlled value. Even when time has passed since use of the mass flow controller 1 is started, unless the state of the mass flow controller 1 changes, there is sufficient reproducibility of the time change of the value (P2) of the pressure of the fluid on the downstream side, and the controlled value does not change (namely, the measured control value does not deviate from the initial controlled value).

On the other hand, since the time alteration of the value (P2) of the pressure of the fluid on the downstream side (second pressure) changes when the state of the mass flow controller 1 changes, the measured control value deviates from the initial controlled value. As a specific example of the change of the state of the mass flow controller 1, for example, generation of abnormality in the flow meter 2, such as change with time in the values of pressure indicated by the pressure sensors 2a and 2b and change in the pressure loss caused by an object adhering to the differential pressure generation means 2c, can be mentioned. Therefore, when the difference between the controlled value acquired based on the value (P2) of the pressure of the fluid on the downstream side recorded by the recording means 5 when the mass flow controller 1 is under operation (measured control value) and the value (P2) of the pressure of the fluid on the downstream side when abnormality has not occurred in the flow meter 2 exceeds a predetermined threshold (larger than the predetermined threshold), it can be considered that some sort of abnormality has occurred in the flow meter 2.

The above-mentioned "predetermined threshold" is a maximum value permissible as an absolute value of a difference between a present controlled value (measured control value) and a controlled value when abnormality has not occurred in the flow meter 2 (initial controlled value). The diagnostic means 6 diagnoses that abnormality has occurred in the flow meter 2 when the absolute value of the difference between these controlled values exceeded the threshold. Therefore, since slight change of the controlled value is considered as abnormality when the threshold is set to a too small value, there is a possibility that an incorrect diagnosis may be done. On the other hand, when the threshold is set to a too large value, there is a possibility that generation of abnormality cannot be detected although abnormality has occurred. Therefore, it is necessary to set the threshold within a suitable range. The threshold can be set for each of the controlled values. When using plural kinds of controlled values simultaneously, individual thresholds can be set for each of the controlled values.

As explained above, the mass flow controller 1 according to the present invention can always diagnose whether abnormality has occurred in the flow meter 2 using timing when the flow control valve 3 is opened and closed during the operation of the mass flow controller 1. Therefore, it is not necessary to prepare time for the diagnosis apart from time for the control of the flow rate, and the fluid can be effectively used without being discarded vainly. Moreover, generation of abnormality in the flow meter 2 which results from abnormality in the pressure sensors 2a and 2b and the differential pressure generation means 2c can be diagnosed quickly and simply.

Figure 3:
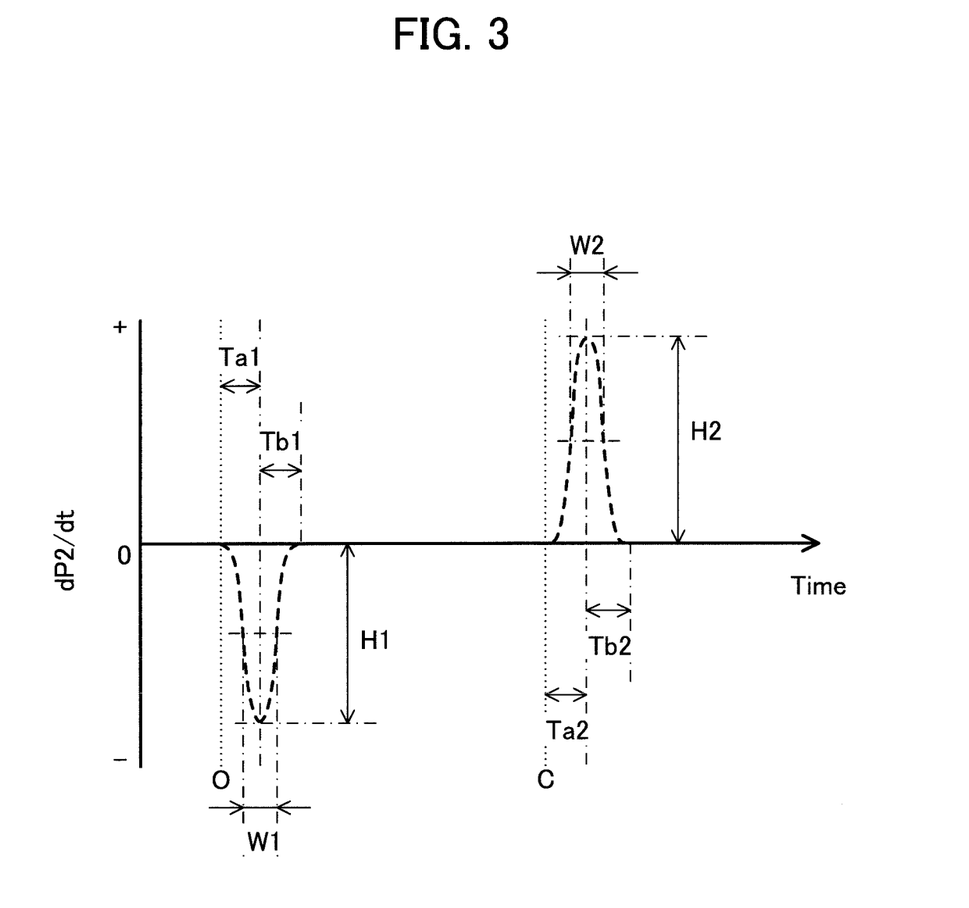
FIG. 3 is a graph for showing an example of change with time of a value obtained by differentiating the value (P2) of pressure of the fluid on the downstream side (second pressure) of the mass flow controller according to aspects of the present invention.

FIG. 3 is a graph for showing an example of change with time of a value obtained by differentiating the value (P2) of pressure of the fluid on the downstream side (second pressure) of a mass flow controller according to the present invention. A value (dP2/dt) obtained by differentiating the value (P2) of the pressure of the fluid on the downstream side with respective to time is shown in a broken line. The value of dP2/dt can be obtained by dividing a difference between two adjacent values among the values (P2) of the pressure of the fluid on the downstream side recorded by the recording means 5 at a fixed time interval, by the time interval, for example.

After the flow control valve 3 changes from its closed state to its open state and the control of the flow rate is started at the time point shown with the symbol "O" in the horizontal axis, the value (P2) of the pressure of the fluid on the downstream side rapidly decreases, and the value of dP2/dt shows a waveform having a peak towards a minus (negative) direction. After the flow control valve 3 changes from its open state to its closed state and the control of the flow rate is stopped at the time point shown with the symbol "C" in the horizontal axis, the value (P2) of the pressure of the fluid on the downstream side rapidly increases, and the value of dP2/dt shows a waveform having a peak towards a plus (positive) direction.

In an embodiment of the present invention, the controlled value is both or either one of a maximum value of an absolute value of the value (dP2/dt) obtained by differentiating the value (P2) of the pressure of the fluid on the downstream side (second pressure) recorded by the recording means 5 with respective to time during the time period after the flow control valve 3 changes from its closed state to its open state and the control of the flow rate is started until the measured flow rate becomes stable and a maximum value of an absolute value of the value (dP2/dt) obtained by differentiating the value (P2) of the pressure of the fluid on the downstream side (second pressure) recorded by the recording means 5 with respective to time during the time period after the flow control valve 3 changes from its open state to its closed state and the control of the flow rate is stopped until the measured flow rate becomes zero. Namely, in this case, the controlled value is both or either one of a maximum value of an absolute value of a value obtained by differentiating the above-mentioned opening pressure value with respective to time and a maximum value of an absolute value of a value obtained by differentiating the above-mentioned closing pressure value with respective to time.

These controlled values correspond respectively to absolute values H1 and H2 of height of peaks of a value of $dP2/dt$ exemplified in FIG. 3, and they serve as indexes for showing magnitudes of time change of the flow rates when the flow control valve 3 opens and when it is closed. When the flow meter 2 has abnormality and does not indicate a correct flow rate of fluid, these controlled values change. Therefore, by contrasting both or either one of these controlled values (measured control values) with corresponding controlled value when abnormality has not occurred in the flow meter 2 (for example, when the flow meter 2 is used for the first time after the flow meter 2 is built in the mass flow controller 1 after production and when the flow meter 2 is used for the first time after calibrating (calibration) of the flow meter 2 is performed, etc.) (initial controlled value), it is possible to diagnose whether abnormality has occurred in the flow meter 2.

In an embodiment of the present invention, the controlled value is both or either one of a time period after the control of the flow rate by the flow control valve 3 is started until the absolute value of the value ($dP2/dt$) obtained by differentiating the value (P2) of the pressure of the fluid on the downstream side recorded by the recording means 5 (namely, the opening pressure value) with respect to time becomes maximum and a time period after the control of the flow rate by the flow control valve 3 is stopped until the absolute value of the value ($dP2/dt$) obtained by differentiating the value (P2) of the pressure of the fluid on the downstream side recorded by the recording means 5 (namely, the closing pressure value) with respect to time becomes maximum. These controlled values correspond respectively to a time period Ta1 from the time point shown with the symbol "O" in FIG. 3 until the time point when the value of $dP2/dt$ shows the peak and a time period Ta2 from the time point shown with the symbol "C" in FIG. 3 until the time point when the value of $dP2/dt$ shows the peak, and they serve as indexes for showing speed of time change of the flow rates when the flow control valve 3 opens and when it is closed. When the flow meter 2 has abnormality and does not indicate a correct flow rate of fluid, these controlled values change. Therefore, by contrasting both or either one of these controlled values (measured control values) with corresponding controlled value when abnormality has not occurred in the flow meter 2 (initial controlled value), it is possible to diagnose whether abnormality has occurred in the flow meter 2.

In an embodiment of the present invention, the controlled value is a time period after the absolute value of the value ($dP2/dt$) obtained by differentiating the value (P2) of the pressure of the fluid on the downstream side (second pressure) recorded by the recording means 5 with respective to time becomes maximum until the absolute value becomes zero. In other words, in this case, the controlled value is both or either one of a time period since the absolute value of the value obtained by differentiating the above-mentioned opening pressure value with respective to time becomes maximum until the absolute value becomes zero and a time period since the absolute value of the value obtained by differentiating the above-mentioned closing pressure value with respective to time becomes maximum until the absolute value becomes zero. These controlled values correspond respectively to time periods Tb1 and Tb2 from the time point when the value of $dP2/dt$ shows the peak until the time point when the value of $dP2/dt$ becomes zero, and they serve as indexes for showing speed of time change of the flow rates when the flow control valve 3 opens and when it is closed. When the flow meter 2 has abnormality and does not indicate a correct flow rate of fluid, these controlled values change. Therefore, by contrasting both or either one of these controlled values (measured control values) with corresponding controlled value when abnormality has not occurred in the flow meter 2 (initial controlled value), it is possible to diagnose whether abnormality has occurred in the flow meter 2.

In a embodiment of the present invention, the controlled value is half-value width of the value ($dP2/dt$) obtained by differentiating the value (P2) of the pressure of the fluid on the downstream side (second pressure) recorder by the recording means 5 with respect to time. In other words, in this case, the controlled value is both or either one of half-value width of a value obtained by differentiating the above-mentioned opening pressure value with respect to time and half-value width of a value obtained by differentiating the above-mentioned closing pressure value with respect to time. In the waveforms of the peaks of $dP2/dt$ shown in FIG. 3, these controlled values correspond to the time periods W1 and W2 between two adjacent time points when the value of $dP2/dt$ is the half of the maximum value, respectively, and they serve as indexes for showing speed of time change of the flow rates when the flow control valve 3 opens and when it is closed. When the flow meter 2 has abnormality and does not indicate a correct flow rate of fluid, these controlled values change. Therefore, by contrasting both or either one of these controlled values (measured control values) with corresponding controlled value when abnormality has not occurred in the flow meter 2 (initial controlled value), it is possible to diagnose whether abnormality has occurred in the flow meter 2.

In an embodiment of the present invention, the flow meter 2 comprises a pressure sensor (first sensor) 2a to measure the value (P1) of the pressure of the fluid on the upstream side (first pressure) and a pressure sensor (second sensor) 2b to measure the value (P2) of the pressure of the fluid on the downstream side (second pressure). In this configuration, the flow meter 2 measures the value (P1) of the pressure of the fluid on the upstream side and the value (P2) of the pressure of the fluid on the downstream side of the differential pressure generation means 2c, respectively by the individual pressure sensors 2a and 2b, and measures the flow rate of the fluid based on these values (for example, the difference (P1−P2) between these values, etc.). As the two pressure sensors 2a and 2b, pressure sensors having the same configuration can be used.

In an embodiment of the present invention, the flow meter 2 comprises either one of a pressure sensor (first sensor) 2a to measure the value (P1) of the pressure of the fluid on the upstream side (first pressure) and a pressure sensor (second sensor) 2b to measure the value (P2) of the pressure of the fluid on the downstream side (second pressure), and a differential pressure sensor (third sensor) to measure a difference between the value (P1) of the pressure of the fluid on the upstream side and the value (P2) of the pressure of the fluid on the downstream side. In this configuration, the flow meter 2 measures the difference (P1−P2) between the value (P1) of the pressure of the fluid on the upstream side and the value (P2) of the pressure of the fluid on the downstream side by one differential pressure sensor (third sensor), and measures the flow rate of the fluid based on that value (for example, the difference (P1−P2) between these values, etc.). The value (P2) of the pressure of the fluid on the downstream side required for implementing the present invention may be directly measured by the pressure sensor (second sensor) 2b to measure the value of the pressure of the fluid on the downstream side, or can be acquired based on the pressure (P1) of the fluid on the upstream side measured by the pressure sensor (first sensor) 2a to measure the value of the pressure of the fluid on the upstream side and the difference (P1−P2) between the pressure measured by the differential pressure sensor (third sensor).

Figure 4:
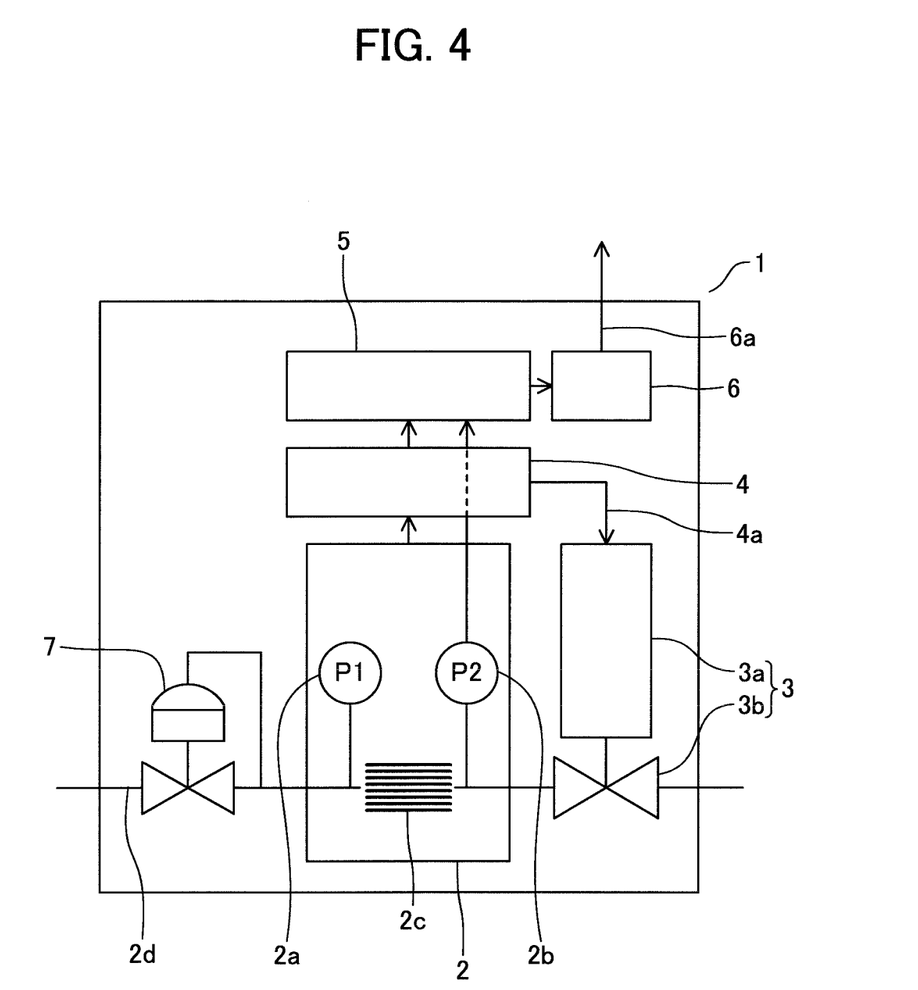
FIG. 4 is a schematic view for showing an example of a configuration of a mass flow controller according to an embodiment of the present invention.

FIG. 4 is a schematic view for showing an example of a configuration of a mass flow controller according to an embodiment of the present invention. The mass flow controller 1 according to the embodiment of the present invention further comprises a mechanical pressure regulating valve 7 disposed adjacent to and on an upstream side of the flow meter 2 in the path 2d. The mechanical pressure regulating valve 7 has a function to hold pressure of the fluid at a fixed value by a mechanical mechanism. This control of pressure is performed independently of the control of the flow rate performed by the control means 4, and is not interfered by the control of the flow rate. Therefore, since the value (P1) of the pressure of the fluid on the upstream side of the differential pressure generation means 2c (first pressure) is always held at a fixed value in this embodiment, the control of the flow rate by the mass flow controller 1 is stabilized. Moreover, precision of the diagnostic of the flow meter 2 by the diagnostic means 6 can be raised.

In an embodiment of the present invention, the flow control valve 3 is disposed on a downstream side of the flow meter 2. This embodiment is beneficial because, by arranging the flow control valve 3 on the downstream side of the flow meter 2, the flow of the fluid can be intercepted instantly when the flow control valve 3 is closed and it is not necessary to discard the fluid vainly. In this embodiment, from a viewpoint of ensuring stability of the control of the flow rate, it is more preferable that the mass flow controller 1 comprises the mechanical pressure regulating valve 7 disposed adjacent to and on the upstream side of the flow meter 2.

In an embodiment of the present invention, the diagnostic means 6 is configured to output an abnormal signal 6a when abnormality is diagnosed to have occurred in the flow meter 2. The abnormal signal 6a may be an electrical signal output to the outside of the mass flow controller 1, for example, as exemplified in FIG. 1 and FIG. 4. When the abnormal signal 6a is output, the flow meter 2 can be made to generate a warning with an indication or sound which can make an operator recognize that abnormality has occurred, by other equipments installed in the mass flow controller 1 or its outside. Thereby, the operator can stop using the mass flow controller 1 on which the warning is made, or can remove the mass flow controller 1 for inspection or replacement.

Moreover, the abnormal signal 6a may be output to a semiconductor producing equipment installed on the downstream side of the mass flow controller 1 to warn the semiconductor producing equipment of generation of abnormality, and can be used as a trigger for stopping its operation temporarily. In accordance with this configuration, the fluid flowing at a flow rate different from the set flow rate due to the generation of the abnormality in the flow meter 2 can be beforehand prevented from being supplied to the semiconductor producing equipment.

As mentioned at the beginning of the present specification, the present invention relates not only to a mass flow controller, but also to a diagnostic method for a differential pressure type flow meter which constitutes a mass flow controller. A diagnostic method for a differential pressure type flow meter according to the present invention is applied to mass flow controllers according to various embodiments including the above-mentioned embodiments of the present invention and performed by the mass flow controller.

Namely, the diagnostic method for a differential pressure type flow meter according to the present invention is applied to a mass flow controller comprising a flow meter configured to measure a flow rate of fluid based on a value of first pressure that is pressure of the fluid on an upstream side of a differential pressure generation means interposed in a path of the fluid and a value of second pressure that is pressure of said fluid on a downstream side of the differential pressure generation means, a flow control valve configured to control the flow rate of the fluid, and a control means configured to output a control signal to the flow control valve such that a measured flow rate that is a flow rate of the fluid measured by the flow meter matches a set flow rate that is a target value of the flow rate of the fluid.

The above-mentioned mass flow controller further comprises a recording means configured to record the value of the second pressure, and a diagnostic means configured to diagnose whether abnormality has occurred in the flow meter based on the value of the second pressure recorded by the recording means.

Since a configuration of the mass flow controller as mentioned above has been already mentioned in detail in the above-mentioned explanation about the mass flow controller 1 according to the present invention, the explanation thereof will not be repeated here. However, the diagnostic method for a differential pressure type flow meter according to the present invention may be applied to mass flow controllers according to various embodiments of the present inventions, including the mass flow controllers according to the embodiments of the present invention explained referring to FIG. 1 to FIG. 4, for example.

Namely, in a mass flow controller, to which the diagnostic method for a differential pressure type flow meter according to an embodiment of the present invention is applied, the flow meter may be configured to comprise a first sensor that is a pressure sensor to measure a value of the first pressure and a second sensor that is a pressure sensor to measure a value of the second pressure. Alternatively, the flow meter may be configured to comprise both or either one of a first sensor that is a pressure sensor to measure a value of the first pressure and a second sensor that is a pressure sensor to measure a value of the second pressure, and a third sensor to measure a difference between the value of the first pressure and the value of the second pressure.

Moreover, the mass flow controller, to which the diagnostic method for a differential pressure type flow meter according to the present invention is applied, may be configured to further comprise a mechanical pressure regulating valve disposed adjacent to and on an upstream side of the flow meter. Furthermore, in the mass flow controller to which the diagnostic method for a differential pressure type flow meter according to the present invention is applied, the flow control valve is disposed on a downstream side of the flow meter.

The diagnostic method for a differential pressure type flow meter according to the present invention is a diagnostic method for a differential pressure type flow meter for judging whether abnormality has occurred in the above-mentioned flow meter, in a mass flow controller having a configuration as mentioned above, wherein:

the recording means records both or either one of an opening pressure value that is a value of the second pressure during a time period after the flow control valve changes from a closed state to an open state and control of the flow rate is started until the measured flow rate becomes stable and a closing pressure value that is a value of the second pressure during a time period after the flow control valve changes from the open state to the closed state and control of the flow rate is stopped until the measured flow rate becomes zero, and the diagnostic means diagnoses that abnormality has occurred in the flow meter when an absolute value of a difference between a measured controlled value that is a controlled value acquired based on both or either one of the opening pressure value and the closing pressure value and an initial controlled value that is the controlled value when abnormality has not occurred in the flow meter exceeds a predetermined threshold.

As mentioned above, in accordance with the diagnostic method for a differential pressure type flow meter according to the present invention, it is possible to always diagnose whether abnormality has occurred in the flow meter 2 using timing when the flow control valve 3 is opened and closed during the operation of the mass flow controller 1. Therefore, it is not necessary to prepare time for the diagnosis apart from time for the control of the flow rate, and the fluid can be effectively used without being discarded vainly. Moreover, generation of abnormality in the flow meter 2 which results from abnormality in the pressure sensors 2a and 2b and the differential pressure generation means 2c can be diagnosed quickly and simply.

In addition, as mentioned in the above-mentioned explanation about the mass flow controller 1 according to the present invention, the controlled value is a representative value reflecting the time change of the value (P2) of the pressure of the fluid on the downstream side (second pressure) recorded by the recording means 5. As long as the controlled value is a representative value specified (acquired) uniquely based on the time change of the value (P2) of the pressure of the fluid on the downstream side, any kind of representative value may be chosen. As the controlled value, one kind of representative value may be chosen, or two or more kinds of a plurality of representative values may also be chosen.

Namely, in the diagnostic method for a differential pressure type flow meter according to an embodiment of the present invention, the controlled value may be both or either one of the maximum value of an absolute value of a value obtained by differentiating the opening pressure value with respect to time and the maximum value of an absolute value of a value obtained by differentiating the closing pressure value with respect to time.

Alternatively, the controlled value may be both or either one of a time period after the control of the flow rate with the flow control valve is started until the absolute value of the value obtained by differentiating the opening pressure value with respect to time becomes maximum and a time period after the control of the flow rate with the flow control valve is stopped until the absolute value of the value obtained by differentiating the closing pressure value with respect to time becomes maximum.

Alternatively, the controlled value may be both or either one of a time period after the absolute value of the value obtained by differentiating the opening pressure value with respect to time becomes maximum until this absolute value becomes zero and a time period after the absolute value of the value obtained by differentiating the closing pressure value with respect to time becomes maximum until this absolute value becomes zero.

Alternatively, the controlled value may be both or either one of half-value width of the value obtained by differentiating the opening pressure value with respect to time and half-value width of the value obtained by differentiating the closing pressure value with respect to time.

Since details of various controlled values in these embodiments and the effectiveness attained by the controlled values have been already mentioned in detail in the above-mentioned explanation about the mass flow controller 1 according to the present invention, the explanation thereof will not be repeated here.

Figure 5:
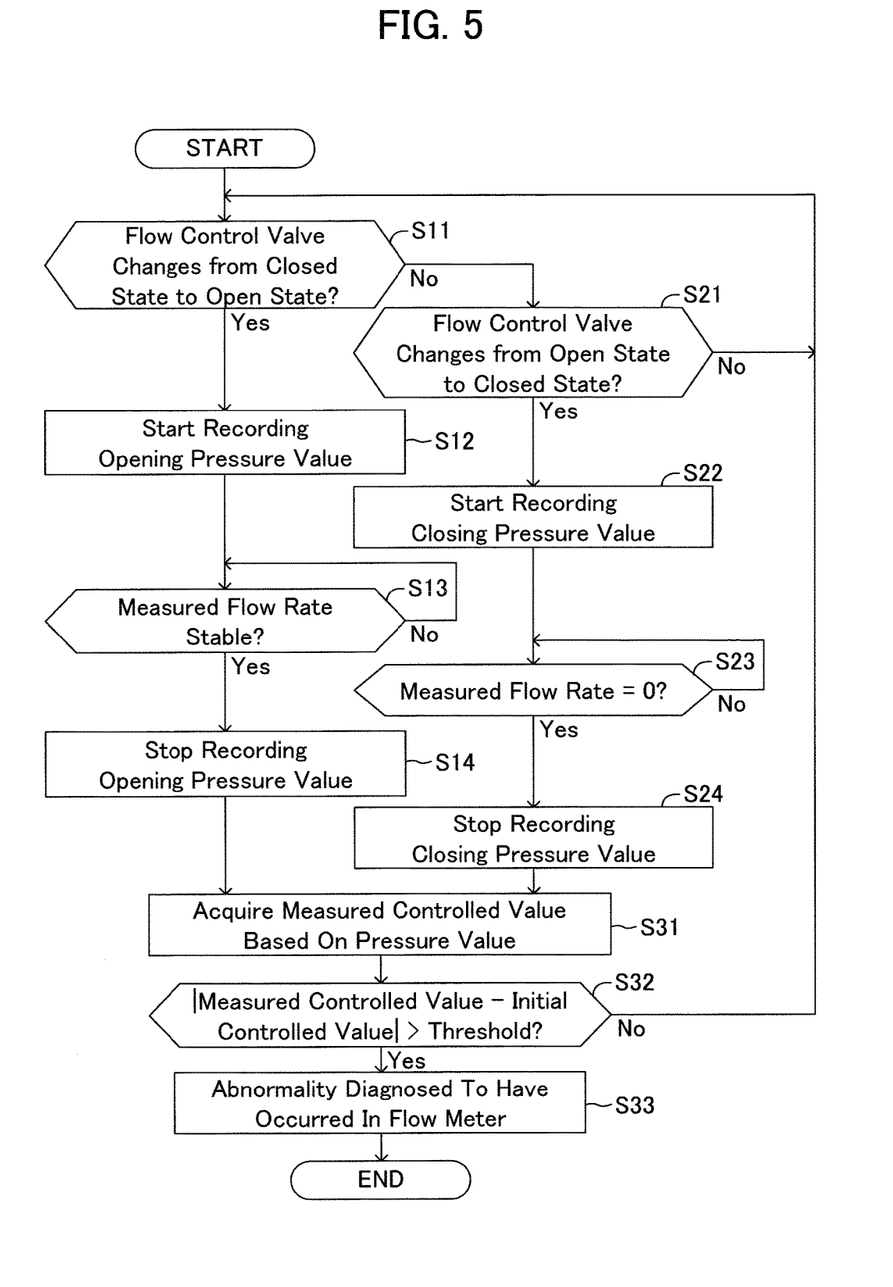
FIG. 5 is a flowchart for showing an example of diagnosis algorithm in the diagnostic method for a differential pressure type flow meter according to aspects of the present invention.

FIG. 5 is a flowchart for showing an example of diagnosis algorithm in the diagnostic method for a differential pressure type flow meter, performed in the mass flow controller 1 according to the present invention. In this example, the diagnosis algorithm is configured to be started using, as a trigger, activation of the mass flow controller 1 or the output of the control signal 4a to the flow control valve 3, for example. First, the diagnosis algorithm diagnoses whether the flow control valve 3 has changed its closed state to its open state (step S11). When the above-mentioned change of state has been observed, the diagnosis algorithm starts recording the value (P2) of the pressure of the fluid on the downstream side (second pressure) (namely, opening pressure value) (step S12). Next, the diagnosis algorithm judges whether the measured flow rate has become stable (step S13). When the measured flow rate has become stable, the diagnosis algorithm stops recording the value (P2) of the pressure of the fluid on the downstream side (step S14), and acquires the controlled value (namely, measured control value) from the value (P2) of the pressure of the fluid on the downstream side recorded in step S12 (step S31).

On the other hand, when the diagnosis algorithm judges that the flow control valve 3 has not changed from its closed state to its open state in the above-mentioned step S11 (step S11: No), the diagnosis algorithm judges whether the flow control valve 3 has changed from its open state to its closed state (step S21). When the above-mentioned change of state has been observed, the diagnosis algorithm starts recording the value (P2) of the pressure of the fluid on the downstream side (second pressure) (namely, closing pressure value) (step S22). Next, the diagnosis algorithm judges whether the measured flow rate has become zero (step S23). When the measured flow rate has become zero, the diagnosis algorithm stops recording the value (P2) of the pressure of the fluid on the downstream side (step S24), and acquires the controlled value (namely, measured control value) from the value (P2) of the pressure of the fluid on the downstream side recorded in step S22 (step S31), as mentioned above.

Then, the diagnosis algorithm judges whether the absolute value of the difference between the measured control value acquired in step S31 and the initial controlled value that is a controlled value which was acquired beforehand based on the opening pressure value when abnormality had not occurred in the flow meter and recorded exceeds a predetermined threshold (step S32). When the above-mentioned absolute value exceeds the threshold, the diagnosis algorithm diagnoses that abnormality has occurred in the flow meter 2 (step S33). When the above-mentioned absolute value does not exceed the threshold, the diagnosis algorithm returns to step S11.

As apparent from the above-mentioned example of the diagnosis algorithm, in accordance with the mass flow controller and the diagnostic method for a differential pressure type flow meter according to the present invention, it is possible to diagnose whether abnormality has occurred in the flow meter 2, without requiring a special process, using the timing of the switching action of the flow control valve 3 in the usual operation. Therefore, as compared with a conventional mass flow controller, its operation is simpler, and the frequency of failure of the flow control valve 3 can be reduced. Moreover, there is no possibility that the fluid is used only for the diagnosis and discarded vainly without being used for its original objective.

Figure 6:
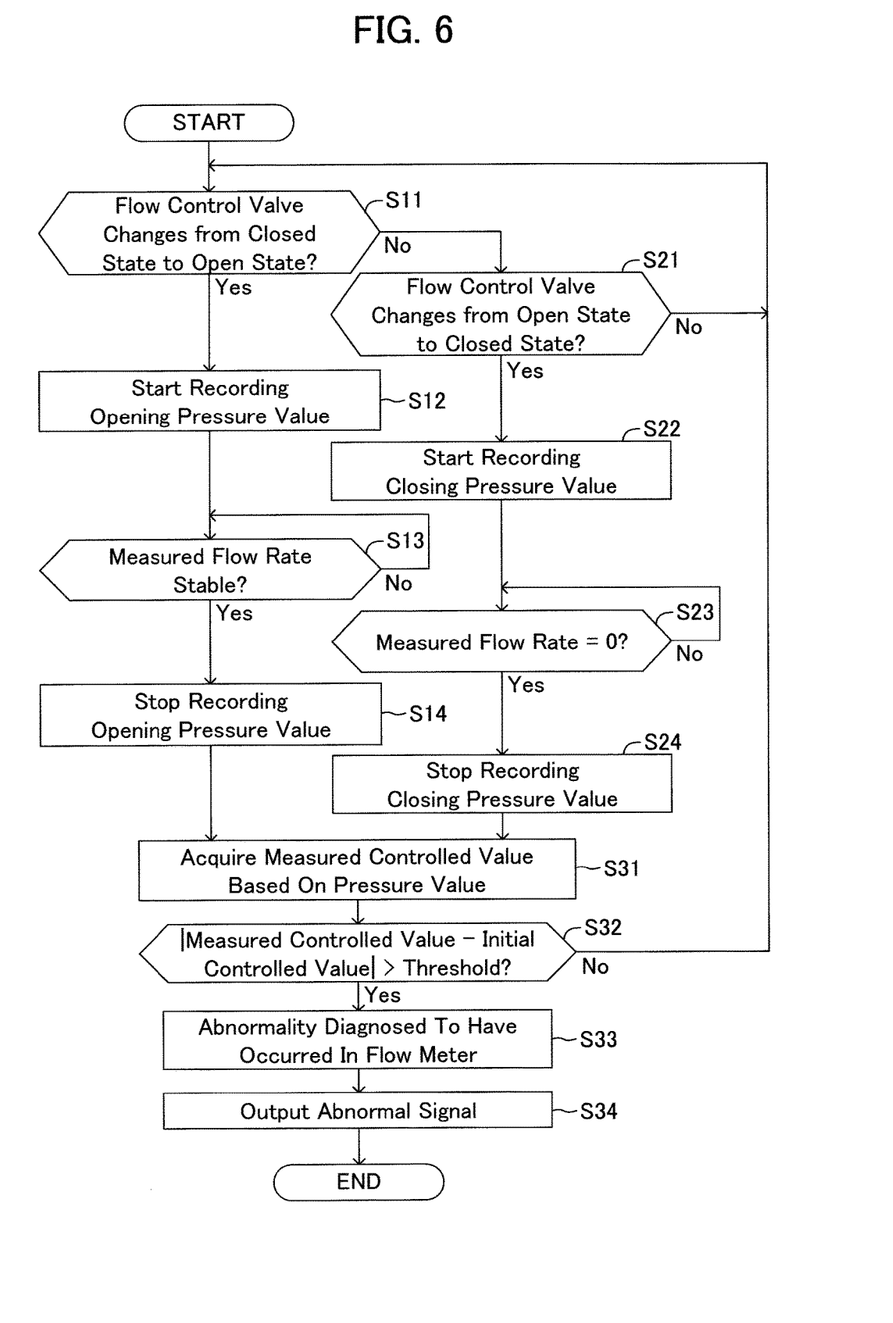
FIG. 6 is a flowchart for showing an example of diagnosis algorithm in the diagnostic method for a differential pressure type flow meter according to another embodiment of the present invention.

Furthermore, in the diagnostic method for a differential pressure type flow meter according to an embodiment of the present invention, the diagnostic means may output an abnormal signal when abnormality is diagnosed to have occurred in the flow meter. In this case, the diagnosis algorithm outputs an abnormal signal 6a (step S34), after diagnosing that abnormality has occurred in the flow meter 2 in step S33, as shown in the flowchart of FIG. 6, for example. Since the effectiveness attained by the output of the abnormal signal in this embodiment had been already mentioned in detail in the above-mentioned explanation about the mass flow controller 1 according to the present invention, the explanation thereof will be not repeated here.

Working Example

One mass flow controller according to embodiments disclosed herein was prepared.

The rated flow of this mass flow controller 1 is 300 sccm (standard cubic centimeter) for nitrogen gas, and the flow meter 2 had been calibrated beforehand to indicate a correct flow rate. In an environment where ambient temperature was held at 24° C., nitrogen gas was supplied to an inlet side of the mass flow controller 1, and pressure on an outlet side was made a vacuum. Then, the set flow rate was set to 100% of the rated flow, and the value (P2) of the pressure of the fluid on the downstream side (second pressure) during a time period after the flow control valve 3 changed form its closed state to its open state and the control of the flow rate was started until the measured flow rate became stable was measured at intervals of 10 ms, and recorded on the recording means 5 as the opening pressure value.

Next, after flowing nitrogen gas for 20 seconds under the condition kept as mentioned above, the set flow rate was changed to 0%, and the value (P2) of the pressure of the fluid on the downstream side (second pressure) during a time period after the flow control valve 3 changed from its open state to its closed state and the control of the flow rate was stopped until the measured flow rate became zero was measured at intervals of 10 ms, and recorded on the recording means 5 as the closing pressure value. For each of the opening pressure value and the closing pressure value recorded on the recording means 5, the value (dP2/dt) obtained by differentiation thereof with respect to time was calculated, and the maximum value of the absolute value of dP2/dt was calculated as the controlled value, respectively. Thus acquired controlled values at the time points of valve-opening and valve-closing are equivalent to the above-mentioned initial controlled values. Thus calculated initial controlled values are shown in Table 1.

Next, a state where abnormality had occurred in the flow meter 2 was artificially made by changing the span of the flow meter 2 and adjusting such that an error of –5.0% arose in the flow rate of the nitrogen gas measured by the flow meter 2. When nitrogen gas was flown and blocked to the mass flow controller 1 in this status according to the same procedure as the above (namely, at the time points of valve-opening and valve-closing), the value (P2) of the pressure of the fluid on the downstream side was measured at intervals of 10 ms, and recorded on the recording means 5 as the opening pressure value and the closing pressure value, respectively. Since the control means 4 tried to flow more nitrogen gas based on the measured flow rate of the flow meter 2, the value (P2) of the pressure of the fluid on the downstream side (second pressure) when the measured flow rate became stable got lower than that before changing the span of the flow meter 2. Furthermore, after adjusting such that an error of –10.0% arose in the flow rate of the nitrogen gas measured by the flow meter 2, the same measurement was performed. The controlled values (measured control values) acquired based on the value (P2) of the pressure of the fluid on the downstream side (namely, the opening pressure value and the closing pressure value) recorded in each of the measurements are shown in Table 1.

TABLE 1

| | Error In Flow Meter | | |
|---|---|---|---|
| | 0% (Initial Controlled Value) | –5.0% (Measured Controlled Value) | –10.0% (Measured Controlled Value) |
| Controlled Value Based On Opening Pressure Value | 430 | 438 | 456 |
| Controlled Value Based On Closing Pressure Value | 394 | 425 | 448 |

From the Working Example shown in Table 1, it has been found that the mass flow controller 1 and the diagnostic method for a differential pressure type flow meter according to the controlled value (measured control value) acquired based on the time change of the value (P2) of the pressure of the fluid on the downstream side (second pressure) when the flow control valve 3 is opened (at the time of valve-opening) or when the flow control valve 3 is closed (at the time of valve-closing) in a case where abnormality has occurred in the flow meter 2 is different from the controlled value (initial controlled value) in a case where abnormality has not occurred in the flow meter 2. Therefore, it is possible to diagnose quickly and simply whether abnormality has occurred in the flow meter 2 of the ma flow controller 1 by always monitoring the measured controlled value at both or either one of the time of valve-opening and the time of valve-closing and compare the same with the initial controlled value.

The invention claimed is:

1. A mass flow controller comprising:
   a flow meter configured to provide a measured flow rate of a fluid based on:
      a value of a first pressure that is a pressure of said fluid on an upstream side of a differential pressure generation means interposed in a path of said fluid; and
      a value of a second pressure that is a pressure of said fluid on a downstream side of said differential pressure generation means;
   a flow control valve configured to control the flow rate of said fluid; and
   a control means configured to output a control signal to said flow control valve such that the measured flow rate matches a set flow rate that is a target value of the flow rate of said fluid;
   wherein said mass flow controller further comprises:
   a recording means configured to record both, or either one of, an opening pressure value and a closing pressure value;
      wherein the opening pressure value is a value of said second pressure during a time period after said flow control valve changes from a closed state to an open state and control of the flow rate is started until said measured flow rate becomes stable;
      wherein the closing pressure value is a value of said second pressure during a time period after said flow control valve changes from the open state to the closed state and control of the flow rate is stopped until said measured flow rate becomes zero; and a diagnostic means configured to diagnose that an abnormality has occurred in said flow meter when an absolute value of a difference between a measured controlled value and an initial controlled value exceeds a predetermined threshold;

wherein the measured controlled value is a controlled value acquired based on both, or either one of, said opening pressure value and said closing pressure value;

wherein the initial controlled value is said controlled value when the abnormality has not occurred in said flow meter; and wherein said controlled value is both, or either one of, the maximum value of an absolute value of a value obtained by differentiating said opening pressure value with respect to time and the maximum value of an absolute value of a value obtained by differentiating said closing pressure value with respect to time.

2. The mass flow controller according to claim 1, wherein: said controlled value is both, or either one of, a time period after the control of the flow rate with said flow control valve is started until the absolute value of the value obtained by differentiating said opening pressure value with respect to time becomes maximum and a time period after the control of the flow rate with said flow control valve is stopped until the absolute value of the value obtained by differentiating said closing pressure value with respect to time becomes maximum.

3. The mass flow controller according to claim 1, wherein: said controlled value is both, or either one of, a time period after the absolute value of the value obtained by differentiating said opening pressure value with respect to time becomes maximum until this absolute value becomes zero and a time period after the absolute value of the value obtained by differentiating said closing pressure value with respect to time becomes maximum until this absolute value becomes zero.

4. The mass flow controller according to claim 1, wherein: said controlled value is both, or either one of, half-value width of the value obtained by differentiating said opening pressure value with respect to time and half-value width of the value obtained by differentiating said closing pressure value with respect to time.

5. The mass flow controller according to claim 1, wherein: said flow meter comprises a first sensor that is a pressure sensor to measure a value of said first pressure and a second sensor that is a pressure sensor to measure a value of said second pressure.

6. The mass flow controller according to claim 1, wherein: said flow meter comprises either one of a first sensor that is a pressure sensor to measure a value of said first pressure and a second sensor that is a pressure sensor to measure a value of said second pressure, and a third sensor that is a differential pressure sensor to measure a difference between the value of said first pressure and the value of said second pressure.

7. The mass flow controller according to claim 1, further comprising a mechanical pressure regulating valve disposed adjacent to and on an upstream side of said flow meter.

8. The mass flow controller according to claim 1, wherein: said flow control valve is disposed on a downstream side of said flow meter.

9. The mass flow controller according to claim 1, wherein: said diagnostic means is configured to output an abnormal signal when the abnormality is diagnosed to have occurred in said flow meter.

10. A diagnostic method to judge whether an abnormality has occurred in a flow meter of a mass flow controller, the method comprising:

measuring a flow rate of fluid based on:
a value of a first pressure that is a pressure of said fluid on an upstream side of a differential pressure generation means interposed in a path of said fluid; and
a value of a second pressure that is a pressure of said fluid on a downstream side of said differential pressure generation means;

controlling the flow rate of said fluid with a control valve;

outputting a control signal from a control means to said flow control valve such that a measured flow rate that is a flow rate of said fluid measured by said flow meter matches a set flow rate that is a target value of the flow rate of said fluid;

recording the value of said second pressure with a recording means; wherein recording includes recording both, or either one of, an opening pressure value and a closing pressure value;

wherein the opening pressure value is a value of said second pressure during a time period after said flow control valve changes from a closed state to an open state and control of the flow rate is started until said measured flow rate becomes stable;

wherein the closing pressure value is a value of said second pressure during a time period after said flow control valve changes from the open state to the closed state and control of the flow rate is stopped until said measured flow rate becomes zero;

diagnosing whether an abnormality has occurred in said flow meter based on the value of said second pressure recorded by said recording means; and diagnosing that an abnormality has occurred in said flow meter when an absolute value of a difference between a measured controlled value and an initial controlled value exceeds a predetermined threshold;

wherein the measured controlled value is a controlled value acquired based on both, or either one of, said opening pressure value and said closing pressure value and an initial controlled value;

wherein the initial controlled value is said controlled value when the abnormality has not occurred in said flow meter; and said controlled value is both or either one of the maximum value of an absolute value of a value obtained by differentiating said opening pressure value with respect to time and the maximum value of an absolute value of a value obtained by differentiating said closing pressure value with respect to time.

11. The diagnostic method of claim 10, wherein: said controlled value is both or either one of a time period after the control of the flow rate with said flow control valve is started until the absolute value of the value obtained by differentiating said opening pressure value with respect to time becomes maximum and a time period after the control of the flow rate with said flow control valve is stopped until the absolute value of the value obtained by differentiating said closing pressure value with respect to time becomes maximum.

12. The diagnostic method of claim 10, wherein: said controlled value is both or either one of a time period after the absolute value of the value obtained by differentiating said opening pressure value with respect to time becomes maximum until this absolute value becomes zero and a time period after the absolute value of the value obtained by differentiating said closing pressure value with respect to time becomes maximum until this absolute value becomes zero.

13. The diagnostic method of claim 10, wherein:

said controlled value is both or either one of half-value width of the value obtained by differentiating said opening pressure value with respect to time and half-value width of the value obtained by differentiating said closing pressure value with respect to time.

14. The diagnostic method of claim 10 wherein:

said flow meter comprises a first sensor that is a pressure sensor to measure a value of said first pressure and a second sensor that is a pressure sensor to measure a value of said second pressure.

15. The diagnostic method of claim 10, wherein:

said flow meter comprises either one of a first sensor that is a pressure sensor to measure a value of said first pressure and a second sensor that is a pressure sensor to measure a value of said second pressure, and a third sensor that is a differential pressure sensor to measure a difference between the value of said first pressure and the value of said second pressure.

16. The diagnostic method of claim 10, wherein:

said mass flow controller further comprises a mechanical pressure regulating valve disposed adjacent to and on an upstream side of said flow meter.

17. The diagnostic method of claim 10, wherein:

said flow control valve is disposed on a downstream side of said flow meter.

18. The diagnostic method of claim 10, wherein:

said diagnostic means outputs an abnormal signal when abnormality is diagnosed to have occurred in said flow meter.

* * * * *